(12) United States Patent
Shurtleff et al.

(10) Patent No.: US 7,438,732 B2
(45) Date of Patent: Oct. 21, 2008

(54) HYDROGEN GENERATOR CARTRIDGE

(75) Inventors: James Kevin Shurtleff, Orem, UT (US); Eric J. Ladd, West Jordan, UT (US); Chris A. Brydon, Salt Lake City, UT (US); John M. Patton, West Jordon, UT (US); Howard Anderson, Cedar Fort, UT (US)

(73) Assignee: Trulite, Inc, Houston, TX (US)

( * ) Notice: Subject to any disclaimer, the term of this patent is extended or adjusted under 35 U.S.C. 154(b) by 73 days.

(21) Appl. No.: 11/270,947

(22) Filed: Nov. 12, 2005

(65) Prior Publication Data

US 2006/0059778 A1    Mar. 23, 2006

Related U.S. Application Data

(63) Continuation-in-part of application No. 10/459,991, filed on Jun. 11, 2003.

(60) Provisional application No. 60/688,456, filed on Jun. 8, 2005, provisional application No. 60/683,024, filed on May 20, 2005, provisional application No. 60/655,373, filed on Feb. 23, 2005, provisional application No. 60/632,460, filed on Dec. 2, 2004, provisional application No. 60/627,257, filed on Nov. 12, 2004.

(51) Int. Cl.
*B01J 7/00* (2006.01)
*C10J 3/00* (2006.01)

(52) U.S. Cl. .............................. 48/61; 48/204; 422/239

(58) Field of Classification Search ................. 422/239, 422/211; 48/61, 204
See application file for complete search history.

(56) References Cited

U.S. PATENT DOCUMENTS

| | | | | |
|---|---|---|---|---|
| 2,542,746 | A | 2/1951 | Banus et al. | 423/288 |
| 3,133,837 | A | 5/1964 | Eidensohn | 429/19 |
| 3,313,598 | A | 4/1967 | Gluckstein | 23/211 |
| 3,449,078 | A | 6/1969 | Quik et al. | 23/212 |
| 3,511,710 | A | 5/1970 | Jung et al. | 136/86 |
| 3,649,360 | A | 3/1972 | Bloomfield et al. | 136/86 |
| 3,734,863 | A | 5/1973 | Beckert et al. | 252/188 |

(Continued)

FOREIGN PATENT DOCUMENTS

EP    1 514 839    *    3/2005
JP    59-78901    *    5/1984

OTHER PUBLICATIONS

Messina-Boyer, Chris. "Millennium Cell Receives Patent on System for Hydrogen Generation," Millennium Cell, Inc., Eatontown, News, Mar. 18, 2003.

(Continued)

*Primary Examiner*—N. Bhat
(74) *Attorney, Agent, or Firm*—Kunzler & McKenzie

(57) ABSTRACT

A fuel cartridge for a hydrogen generating system having a cartridge containing a substantially anhydrous chemical hydride reactant. A plurality of liquid conduits extends into the cartridge and each of the liquid conduits has a length and a plurality of liquid distribution apertures formed along the length. The liquid distribution apertures have a diameter of less than approximately 1 mm. The chemical hydride reactant forms a bed and the liquid conduits extend along at least half of a length of the bed.

17 Claims, 9 Drawing Sheets

U.S. PATENT DOCUMENTS

| | | | |
|---|---|---|---|
| 3,940,474 A | 2/1976 | Huskins et al. | 423/648 |
| 3,977,990 A | 8/1976 | Beckert et al. | 252/188.3 |
| 4,000,003 A | 12/1976 | Baker et al. | 429/7 |
| 4,155,712 A | 5/1979 | Taschek | 422/239 |
| 4,261,955 A | 4/1981 | Bailey, Jr. et al. | 422/239 |
| 4,261,956 A * | 4/1981 | Adlhart | 422/239 |
| 4,433,633 A | 2/1984 | Caudy et al. | 114/54 |
| 4,436,793 A | 3/1984 | Adlhart | 429/17 |
| 4,463,066 A | 7/1984 | Adlhart et al. | 429/34 |
| 4,463,068 A | 7/1984 | Cohn et al. | 429/34 |
| 4,486,276 A | 12/1984 | Cohn et al. | 204/98 |
| 4,513,065 A | 4/1985 | Adlhart | 429/19 |
| 4,543,246 A | 9/1985 | Houser | 423/648 |
| 4,628,010 A | 12/1986 | Iwanciow | 429/19 |
| 4,740,504 A | 4/1988 | Hall et al. | 514/64 |
| 4,782,096 A | 11/1988 | Banquy | 518/704 |
| 4,962,462 A | 10/1990 | Fekete | 364/492 |
| 4,968,393 A | 11/1990 | Mazur | 204/59 |
| 4,973,530 A | 11/1990 | Vanderborgh et al. | 429/13 |
| 4,978,451 A | 12/1990 | Taylor | 210/500 |
| 4,988,583 A | 1/1991 | Watkins et al. | 429/30 |
| 5,047,301 A | 9/1991 | Adlhart et al. | 429/101 |
| 5,108,849 A | 4/1992 | Watkins et al. | 429/30 |
| 5,200,278 A | 4/1993 | Watkins et al. | 429/24 |
| 5,205,841 A | 4/1993 | Vaiman | 55/16 |
| 5,229,222 A | 7/1993 | Tsutsumi et al. | 429/19 |
| 5,264,299 A | 11/1993 | Krasij et al. | 429/30 |
| 5,292,600 A | 3/1994 | Kaufman | 429/39 |
| 5,314,762 A | 5/1994 | Hamada et al. | 429/37 |
| 5,366,820 A | 11/1994 | Tsutsumi et al. | 429/19 |
| 5,372,617 A | 12/1994 | Kerrebrock et al. | 48/61 |
| 5,382,478 A | 1/1995 | Chow | 429/26 |
| 5,514,353 A * | 5/1996 | Adlhart | 422/239 |
| 5,557,188 A | 9/1996 | Piercey | 320/5 |
| 5,593,640 A | 1/1997 | Long et al. | 422/111 |
| 5,599,640 A | 2/1997 | Lee et al. | 429/46 |
| 5,634,341 A | 6/1997 | Klanchar et al. | 60/673 |
| 5,683,828 A | 11/1997 | Spear et al. | 429/13 |
| 5,688,611 A | 11/1997 | Golben | 429/53 |
| 5,702,491 A | 12/1997 | Long et al. | 48/197 |
| 5,728,464 A * | 3/1998 | Checketts | 428/403 |
| 5,747,189 A | 5/1998 | Perkins | 429/91 |
| 5,804,329 A | 9/1998 | Amendola | 429/34 |
| 5,833,934 A * | 11/1998 | Adlhart | 422/239 |
| 5,843,297 A | 12/1998 | Smid et al. | 205/687 |
| 5,858,587 A | 1/1999 | Yamane et al. | 430/22 |
| 5,863,671 A | 1/1999 | Spear | 429/12 |
| 5,932,365 A | 8/1999 | Lin et al. | 429/12 |
| 5,948,558 A | 9/1999 | Amendola | 429/50 |
| 5,955,039 A | 9/1999 | Dowdy | 422/189 |
| 5,962,155 A | 10/1999 | Kuranaka et al. | 429/20 |
| 5,976,725 A | 11/1999 | Gamo et al. | 429/25 |
| 5,996,976 A | 12/1999 | Murphy | 261/104 |
| 6,051,128 A | 4/2000 | Nacamuli | 208/79 |
| 6,051,331 A | 4/2000 | Spear, Jr. et al. | 429/34 |
| 6,066,409 A | 5/2000 | Ronne | 429/39 |
| 6,072,299 A | 6/2000 | Kurle et al. | 320/112 |
| 6,090,312 A | 7/2000 | Ziaka | 252/373 |
| 6,096,286 A | 8/2000 | Autenrieth | 423/651 |
| 6,097,175 A | 8/2000 | Yoon | 320/132 |
| 6,106,965 A | 8/2000 | Hirano et al. | 429/30 |
| 6,106,968 A | 8/2000 | Johnson et al. | 429/50 |
| 6,108,968 A | 8/2000 | Peng | 47/24 |
| 6,110,611 A | 8/2000 | Stuhler et al. | 429/13 |
| 6,156,450 A | 12/2000 | Bailey | 429/93 |
| 6,198,253 B1 | 3/2001 | Kurle et al. | 320/132 |
| 6,231,825 B1 | 5/2001 | Colby et al. | 423/286 |
| 6,236,326 B1 | 5/2001 | Murphy | 340/636 |
| 6,238,814 B1 | 5/2001 | Horiguchi et al. | 429/12 |
| 6,250,078 B1 | 6/2001 | Amendola et al. | 60/509 |
| 6,268,077 B1 | 7/2001 | Kelley et al. | 429/33 |
| 6,274,093 B1 | 8/2001 | Long et al. | 422/129 |
| 6,312,848 B1 | 11/2001 | Kilb et al. | 429/162 |
| 6,337,120 B1 | 1/2002 | Sasaki et al. | 428/66.04 |
| 6,387,228 B1 | 5/2002 | Maget | 204/230.2 |
| 6,387,557 B1 | 5/2002 | Krasij et al. | 429/32 |
| 6,399,234 B2 | 6/2002 | Bonk et al. | 429/32 |
| 6,428,918 B1 | 8/2002 | Fuglevand et al. | 429/13 |
| 6,433,129 B1 | 8/2002 | Amendola et al. | 528/271 |
| 6,468,682 B1 | 10/2002 | Fuglevand et al. | 429/26 |
| 6,468,694 B1 | 10/2002 | Amendola | 429/218.1 |
| 6,483,274 B2 | 11/2002 | Lee | 320/132 |
| 6,495,278 B1 | 12/2002 | Schmid et al. | 429/30 |
| 6,497,973 B1 | 12/2002 | Amendola | 429/19 |
| 6,497,974 B2 | 12/2002 | Fuglevand | 429/22 |
| 6,500,577 B2 | 12/2002 | Foster | 429/32 |
| 6,503,649 B1 | 1/2003 | Czajkowski et al. | 429/23 |
| 6,524,542 B2 | 2/2003 | Amendola et al. | 423/286 |
| 6,531,630 B2 | 3/2003 | Vidalin | 562/519 |
| 6,533,827 B1 | 3/2003 | Cisar et al. | 29/623.4 |
| 6,534,033 B1 * | 3/2003 | Amendola et al. | 423/648.1 |
| 6,541,147 B1 | 4/2003 | McLean et al. | 249/35 |
| 6,544,400 B2 | 4/2003 | Hockaday et al. | 205/338 |
| 6,544,679 B1 | 4/2003 | Petillo et al. | 429/34 |
| 6,554,400 B1 | 4/2003 | Aoki | 347/47 |
| 6,576,350 B2 * | 6/2003 | Buxbaum | 428/670 |
| 6,586,563 B1 | 7/2003 | Ortega et al. | 528/394 |
| 6,599,653 B1 | 7/2003 | Cummins et al. | 429/35 |
| 6,602,631 B1 | 8/2003 | Cisar et al. | 429/34 |
| 6,607,857 B2 | 8/2003 | Blunk et al. | 429/34 |
| 6,645,651 B2 | 11/2003 | Hockaday et al. | 429/19 |
| 6,649,097 B2 | 11/2003 | Sasaki et al. | 264/102 |
| 6,653,003 B1 | 11/2003 | Tsai et al. | 429/17 |
| 6,670,444 B2 | 12/2003 | Amendola et al. | 528/394 |
| 6,683,025 B2 | 1/2004 | Amendola et al. | 502/439 |
| 6,685,570 B2 | 2/2004 | Zilberman et al. | 464/94 |
| 6,688,106 B2 | 2/2004 | Okusawa et al. | 60/653 |
| 6,703,722 B2 | 3/2004 | Christiansen | 307/71 |
| 6,706,909 B1 | 3/2004 | Snover et al. | 558/296 |
| 6,733,916 B2 | 5/2004 | Mizuno | 429/36 |
| 6,743,542 B2 | 6/2004 | Krasij et al. | 429/36 |
| 6,745,801 B1 | 6/2004 | Cohen et al. | 141/231 |
| 6,746,496 B1 | 6/2004 | Kravitz et al. | 481/118.5 |
| 6,755,219 B1 | 6/2004 | Bolle | 14/19 |
| 6,764,786 B2 | 7/2004 | Morrow et al. | 429/37 |
| 6,770,186 B2 | 8/2004 | Rosenfeld et al. | 205/343 |
| 6,777,127 B2 | 8/2004 | Einhart et al. | 429/35 |
| 6,787,008 B2 | 9/2004 | Joshi et al. | 204/252 |
| 6,794,418 B2 | 9/2004 | Sogge et al. | 518/706 |
| 6,805,987 B2 | 10/2004 | Bai et al. | 429/23 |
| 6,811,764 B2 | 11/2004 | Jorgensen et al. | 423/658.2 |
| 6,811,906 B2 | 11/2004 | Bai et al. | 492/13 |
| 6,811,918 B2 | 11/2004 | Blunk et al. | 429/40 |
| 6,815,110 B2 | 11/2004 | Marsh | 429/30 |
| 6,818,334 B2 | 11/2004 | Tsang | 429/17 |
| 6,821,499 B2 | 11/2004 | Jorgensen | 423/648.1 |
| 6,827,747 B2 | 12/2004 | Lisi et al. | 29/623.1 |
| 6,899,967 B2 | 5/2005 | Johnson | 429/19 |
| 6,901,302 B2 | 5/2005 | Kami | 700/90 |
| 6,904,533 B2 | 6/2005 | Kuo et al. | 713/322 |
| 6,932,847 B2 | 8/2005 | Amendola et al. | 48/76 |
| 6,939,529 B2 | 9/2005 | Strizki et al. | 423/658.2 |
| 7,019,105 B2 | 3/2006 | Amendola et al. | 528/271 |
| 7,052,671 B2 | 5/2006 | McClaine et al. | 423/658.2 |
| 7,074,509 B2 * | 7/2006 | Rosenfeld et al. | 429/19 |
| 7,083,657 B2 | 8/2006 | Mohring et al. | 48/61 |
| 7,105,033 B2 | 9/2006 | Strizki et al. | 48/61 |
| 7,108,777 B2 | 9/2006 | Xu et al. | 205/408 |
| 7,166,269 B2 | 1/2007 | Tanaka et al. | 423/657 |
| 2001/0025289 A1 | 9/2001 | Jenkins et al. | 708/141 |
| 2001/0043274 A1 | 11/2001 | Shepherd et al. | 348/241 |
| 2001/0045364 A1 * | 11/2001 | Hockaday et al. | 205/338 |
| 2001/0046616 A1 | 11/2001 | Mossmann | 429/13 |
| 2002/0022162 A1 | 2/2002 | Kagitani | 429/17 |

| | | | |
|---|---|---|---|
| 2002/0022168 A1 | 2/2002 | Faris et al. | 429/27 |
| 2002/0022170 A1 | 2/2002 | Franklin et al. | 429/34 |
| 2002/0045075 A1 | 4/2002 | Pinto et al. | 429/15 |
| 2002/0045082 A1 | 4/2002 | Marsh | 429/30 |
| 2002/0058168 A1 | 5/2002 | Voss et al. | 429/13 |
| 2002/0076598 A1 | 6/2002 | Bostaph et al. | 429/38 |
| 2002/0083643 A1 | 7/2002 | Amendola et al. | 48/61 |
| 2002/0106541 A1 | 8/2002 | Yamada et al. | 429/21 |
| 2002/0106550 A1 | 8/2002 | Nishiki et al. | 429/42 |
| 2002/0150804 A1 | 10/2002 | Srinivasan et al. | 429/32 |
| 2002/0165417 A1 | 11/2002 | Numaguchi et al. | 585/310 |
| 2002/0166286 A1 | 11/2002 | McClaine et al. | 48/197 |
| 2002/0171021 A1 | 11/2002 | Goretti | 248/455 |
| 2002/0177015 A1 | 11/2002 | Fuglevand | 429/12 |
| 2002/0177018 A1 | 11/2002 | Fuglevand | 429/12 |
| 2002/0177042 A1 | 11/2002 | Amendola | 429/218.1 |
| 2002/0182470 A1 | 12/2002 | Agizy et al. | 429/34 |
| 2003/0001299 A1 | 1/2003 | Yoshioka et al. | 429/34 |
| 2003/0003038 A1 | 1/2003 | Amendola et al. | 423/286 |
| 2003/0008187 A1 | 1/2003 | Higashiyama et al. | 429/19 |
| 2003/0008194 A1 | 1/2003 | Cargneli et al. | 429/39 |
| 2003/0009942 A1 | 1/2003 | Amendola et al. | 48/61 |
| 2003/0037487 A1 | 2/2003 | Amendola et al. | 48/76 |
| 2003/0051785 A1 | 3/2003 | Gauthier et al. | 43/0 |
| 2003/0091882 A1 | 5/2003 | Schmidt et al. | 429/23 |
| 2003/0092877 A1 | 5/2003 | Amendola et al. | 528/394 |
| 2003/0098258 A1 | 5/2003 | Gregory et al. | 208/89 |
| 2003/0111908 A1 | 6/2003 | Christensen | 307/43 |
| 2003/0113259 A1 | 6/2003 | Rusta-Sallehy et al. | 423/658.2 |
| 2003/0114632 A1 | 6/2003 | Ortega et al. | 528/196 |
| 2003/0162059 A1 | 8/2003 | Gelsey | 429/17 |
| 2003/0180603 A1 | 9/2003 | Richards | 429/38 |
| 2003/0194596 A1 | 10/2003 | Ye et al. | 429/38 |
| 2003/0204993 A1 | 11/2003 | Holland et al. | 48/27.9 |
| 2003/0219371 A1 | 11/2003 | Amendola | 423/351 |
| 2003/0219641 A1 | 11/2003 | Petillo | 429/38 |
| 2003/0226763 A1 | 12/2003 | Narayanan et al. | 205/43 |
| 2003/0228252 A1 | 12/2003 | Shurtleff | 423/657 |
| 2003/0228505 A1 | 12/2003 | Tsang | 429/19 |
| 2003/0232225 A1 | 12/2003 | Maruyama et al. | 429/22 |
| 2003/0235749 A1 | 12/2003 | Haltiner, Jr. et al. | 429/38 |
| 2004/0005488 A1 | 1/2004 | Faris et al. | 429/23 |
| 2004/0009379 A1 | 1/2004 | Amendola et al. | 429/17 |
| 2004/0009392 A1 | 1/2004 | Petillo et al. | 429/122 |
| 2004/0011662 A1 | 1/2004 | Xu et al. | 205/408 |
| 2004/0025808 A1* | 2/2004 | Cheng | 123/3 |
| 2004/0031695 A1 | 2/2004 | Oloman et al. | 205/615 |
| 2004/0033194 A1 | 2/2004 | Amendola et al. | 423/658.2 |
| 2004/0035054 A1 | 2/2004 | Mohring et al. | 48/61 |
| 2004/0043274 A1 | 3/2004 | Scartozzi et al. | 429/34 |
| 2004/0047801 A1 | 3/2004 | Petillo et al. | 423/657 |
| 2004/0052723 A1 | 3/2004 | Jorgensen | 423/648.1 |
| 2004/0053100 A1 | 3/2004 | Stanley et al. | 429/30 |
| 2004/0065865 A1 | 4/2004 | Desgardin et al. | 252/188.25 |
| 2004/0067195 A1 | 4/2004 | Strizki et al. | 423/658.2 |
| 2004/0072041 A1 | 4/2004 | Koschany | 429/23 |
| 2004/0081884 A1 | 4/2004 | Bean et al. | 429/98 |
| 2004/0109374 A1 | 6/2004 | Sundar | 365/226 |
| 2004/0115493 A1 | 6/2004 | Kim | 429/20 |
| 2004/0120889 A1 | 6/2004 | Shah et al. | 423/657 |
| 2004/0121196 A1 | 6/2004 | Liu et al. | 429/12 |
| 2004/0148857 A1 | 8/2004 | Strizki et al. | 48/127.9 |
| 2004/0160216 A1 | 8/2004 | Speranza et al. | 320/140 |
| 2004/0161646 A1 | 8/2004 | Rezachek et al. | 429/19 |
| 2004/0161652 A1 | 8/2004 | Ovshinsky et al. | 429/19 |
| 2004/0166057 A1 | 8/2004 | Schell et al. | 423/658.2 |
| 2004/0180247 A1 | 9/2004 | Higashiyama et al. | 429/19 |
| 2004/0180253 A1 | 9/2004 | Fisher | 429/34 |
| 2004/0191152 A1 | 9/2004 | Amendola et al. | 423/288 |
| 2004/0191588 A1* | 9/2004 | Eshraghi et al. | 429/19 |
| 2004/0200903 A1 | 10/2004 | Ohya et al. | 235/492 |
| 2004/0214056 A1 | 10/2004 | Gore | 429/20 |
| 2004/0214057 A1 | 10/2004 | Fuglevand et al. | 429/20 |
| 2004/0219398 A1 | 11/2004 | Calhoon | 429/13 |
| 2004/0219399 A1 | 11/2004 | Zhu et al. | 429/13 |
| 2004/0253496 A1 | 12/2004 | Foster | 429/30 |
| 2005/0013771 A1 | 1/2005 | Amendola | 423/658.2 |
| 2005/0014044 A1 | 1/2005 | Thirukkovalur et al. | 429/26 |
| 2005/0016840 A1 | 1/2005 | Petillo | 204/248 |
| 2005/0017216 A1 | 1/2005 | Poetsch et al. | 252/299.61 |
| 2005/0017646 A1 | 1/2005 | Boulos et al. | 315/111.41 |
| 2005/0038267 A1 | 2/2005 | Poetsch et al. | 549/294 |
| 2005/0058595 A1* | 3/2005 | Shi et al. | 423/657 |
| 2005/0124016 A1 | 6/2005 | LaDu et al. | 435/7.92 |
| 2005/0132640 A1 | 6/2005 | Kelly et al. | 44/301 |
| 2005/0135996 A1 | 6/2005 | Ortega et al. | 423/648.1 |
| 2005/0162122 A1 | 7/2005 | Dunn et al. | 320/101 |
| 2005/0233184 A1 | 10/2005 | Dunn et al. | 429/12 |
| 2005/0238573 A1 | 10/2005 | Zhang et al. | 423/648.1 |
| 2005/0268555 A1 | 12/2005 | Amendola et al. | 48/61 |
| 2005/0271905 A1 | 12/2005 | Dunn et al. | 429/11 |
| 2005/0276746 A1 | 12/2005 | Zhang et al. | 423/651 |
| 2006/0021279 A1 | 2/2006 | Mohring et al. | 48/61 |
| 2006/0058527 A1 | 3/2006 | Kirsch et al. | 544/333 |
| 2006/0102489 A1 | 5/2006 | Kelly | 205/357 |
| 2006/0102491 A1 | 5/2006 | Kelly et al. | 205/407 |
| 2006/0144701 A1 | 7/2006 | Kelly | 204/267 |
| 2006/0169593 A1 | 8/2006 | Xu et al. | 205/406 |
| 2006/0196112 A1 | 9/2006 | Berry et al. | 44/550 |
| 2006/0210841 A1 | 9/2006 | Wallace et al. | 429/12 |
| 2006/0225350 A1 | 10/2006 | Spallone et al. | 48/198.2 |
| 2006/0236606 A1 | 10/2006 | Strizki et al. | 48/127.9 |
| 2006/0269470 A1 | 11/2006 | Zhang et al. | 423/648.1 |
| 2006/0292067 A1 | 12/2006 | Zhang et al. | 423/648.1 |
| 2006/0293173 A1 | 12/2006 | Zhang et al. | 502/182 |
| 2007/0011251 A1 | 1/2007 | McNamara et al. | 709/206 |
| 2007/0020510 A1 | 1/2007 | Dunn et al. | 429/65 |

OTHER PUBLICATIONS

"A Novel High Power Density Borohydride-Air Cell," Amendola S.C. et al., Journal of Power Sources, vol. 84, No. 1, Nov. 1999, pp. 130-133(4).

"Enabling Fuel Cells for Standby Power-Chemical Hydride Fueling Technology," Smith, G.M., et al. Millennium Cell Inc., Eatontown, Telecommunications Energy Conference, 2004, Sep. 19-23, 2004.

"Recent Advances in Hydrogen Storage in Metal-Containing Inorganic Nanostructures and Related Materials," Seayad, A.M., et al. Copyright 2004 May 19, 2004.

"Hydrogn Generation Via Sodium Borohydride," Mohring, R.M., et al. Millennium Cell, Inc., Eatontown, AIP Conference Proceedings-Jul. 11, 2003-vol. 671, Issue 1, pp. 90-100.

"Solid Storage," Luzader, R., Millennium Cell, Inc., Eatontown, News, Jun./Jul. 2003.

"Will Fuel Cells Replace Batteries in Mobile Devices?"Paulson, L.D. Millennium Cell, Inc.' Eatontown, News, Nov. 2003.

"Fuel Chemistry News" Newsletter of the ACS Division of Fuel Chemistry, vol. 82, No. 2, Fall 2003.

"VI.B.4 DOE Chemical Hydrogen Storage Center of Excellence" Tumas, W. et al., FY 2005 Progress Report.

"Review of Chemical Processes for the Synthesis of Sodium Borohydride" Wo, Y. et al., Millennium Cell Inc., Aug. 2004.

"A safe, portable, hydrogen gas generator using aqueous borohydride solution and Ru catalyst" Amendola, S.C. et al., International Journal of Hydrogen Energy 25 (2000) 969-975.

Schlesinger et al. "Sodium Borohydride, Its Hydrolysis and its Use as a Reducing Agent and in the Generation of Hydrogen," Mar. 15, 1952.

Aiello et al. "Production of Hydrogen form Chemical Hydrides Via Hydrolysis with Steam," International Journal of Hydrogen Energy vol. 24 (1999) pp. 1123-1130.

Aiello et al. "Production of Hydrogen Gas From Novel Chemical Hydrides," International Journal of Hydrogen Energy vol. 23 (1998) pp. 1103-1108.

* cited by examiner

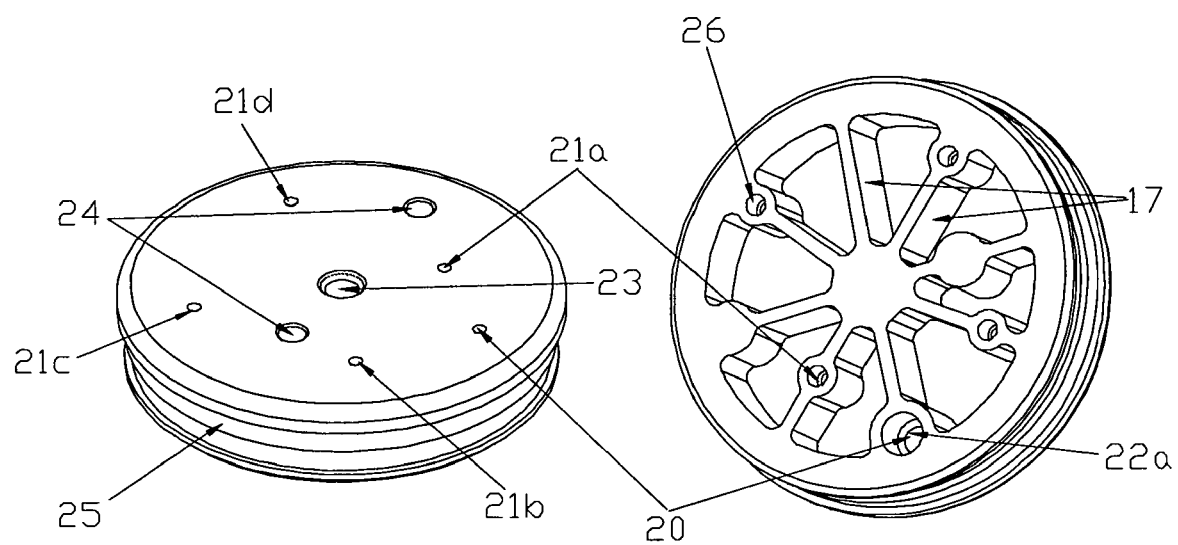
Figure 3A
Figure 3B
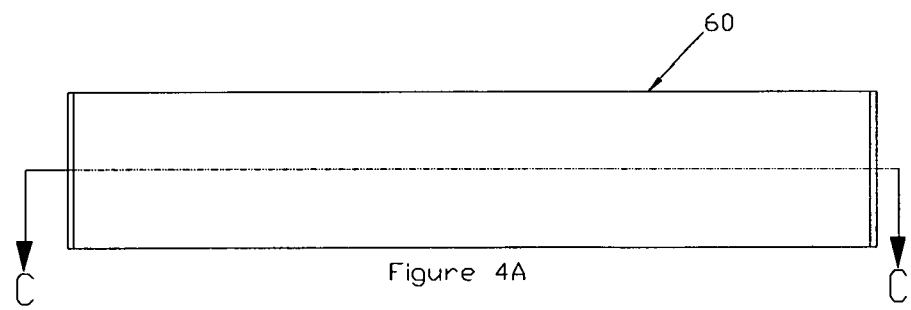
Figure 4A
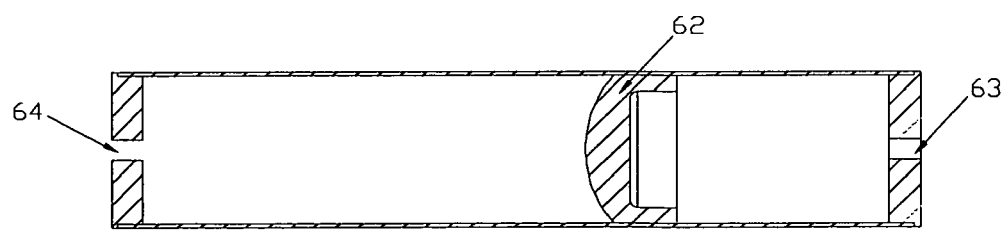
Figure 4B – Section CC

HYDROGEN GENERATOR CARTRIDGE

The application is a continuation-in-part of U.S. Ser. No. 10/459,991 filed Jun. 11, 2003 and claims the benefit under 35 U.S.C. §119(e) of U.S. Provisional Applications Ser. Nos. 60/627,257 filed Nov. 12, 2004, 60/632,460 filed Dec. 2, 2004, 60/655,373 filed Feb. 23, 2005, 60/683,024 filed May 20, 2005, and 60/688,456 filed Jun. 8, 2005, each of which is incorporated by reference herein in its entirety.

FIELD OF INVENTION

The present invention relates to apparatuses and methods for producing hydrogen. The embodiments described herein relate to apparatuses and methods for releasing hydrogen from chemical hydrides.

BRIEF DESCRIPTION OF DRAWINGS

FIGS. 3A and 3B are perspective views of the front and rear of the front end cap of the fuel cartridge seen in FIG. 1.

FIGS. 4A and 4B illustrate the acid reservoir employed in one embodiment of the present invention.

DETAILED DESCRIPTION OF INVENTION

Figure 1A:
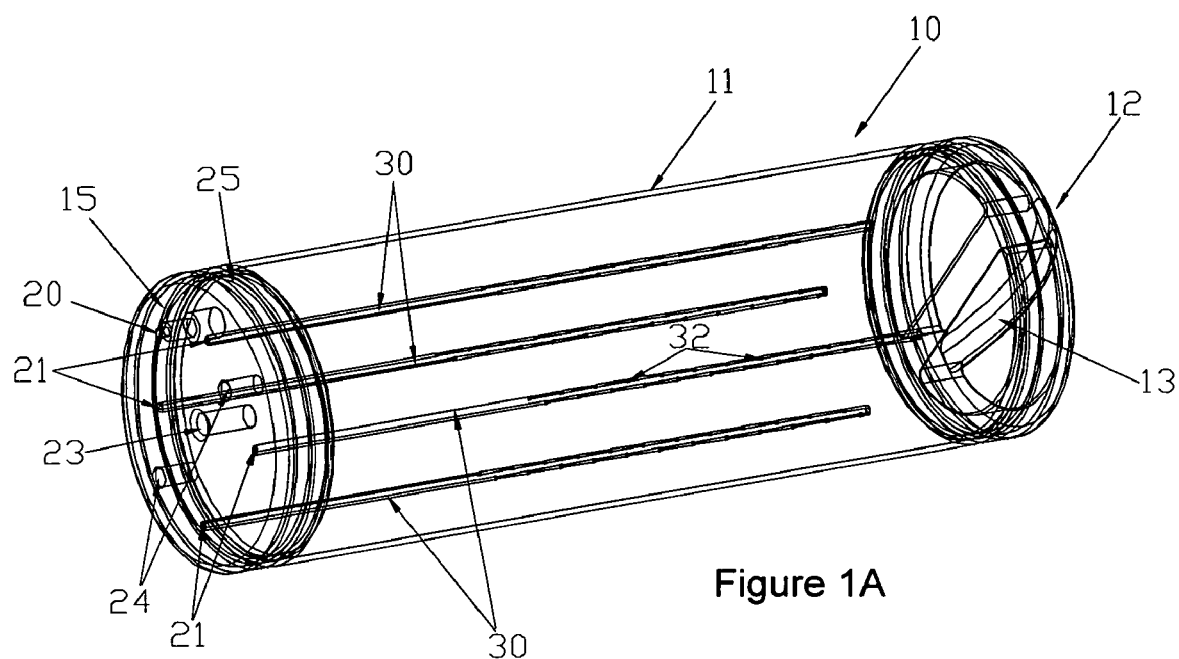
FIGS. 1A and 1B are perspective views of two embodiments of the hydrogen fuel cartridge of the present invention.

FIG. 1A illustrates one embodiment of a hydrogen fuel cartridge which may be employed in the hydrogen generation system of the present invention. Fuel cartridge 10 may include a tubular body or housing 11, which in this embodiment ranges from 1 to 3 inches in diameter and 4 to 8 inches in length. Naturally, housing 11 is not limited to any particular cross-sectional shape or any particular dimensions. In one preferred embodiment, housing 11 is formed of a material such as aluminum which has sufficient strength, is comparatively light, and has good heat transfer characteristics. However, many substitute materials will be readily apparent to those skilled in the art, including steel, stainless steel, copper, carbon fiber epoxy composites, fiberglass epoxy composites, PEEK, polysulfone derivatives, polypropylene, PVC, or other suitable materials. FIG. 1A's embodiment also illustrates a rear end cap 12 having a handle 13 allowing fuel cartridge 10 to be easily positioned and locked into place with other components of the overall hydrogen generation system as will be described below.

Figure 1B:
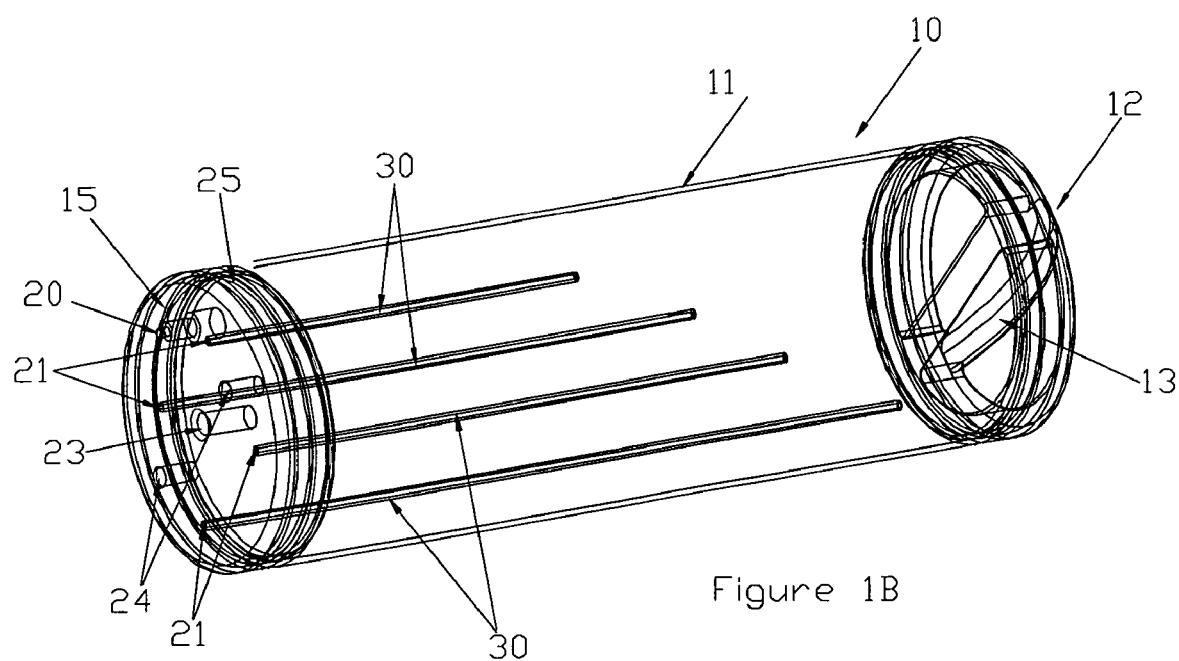
Figure 2:
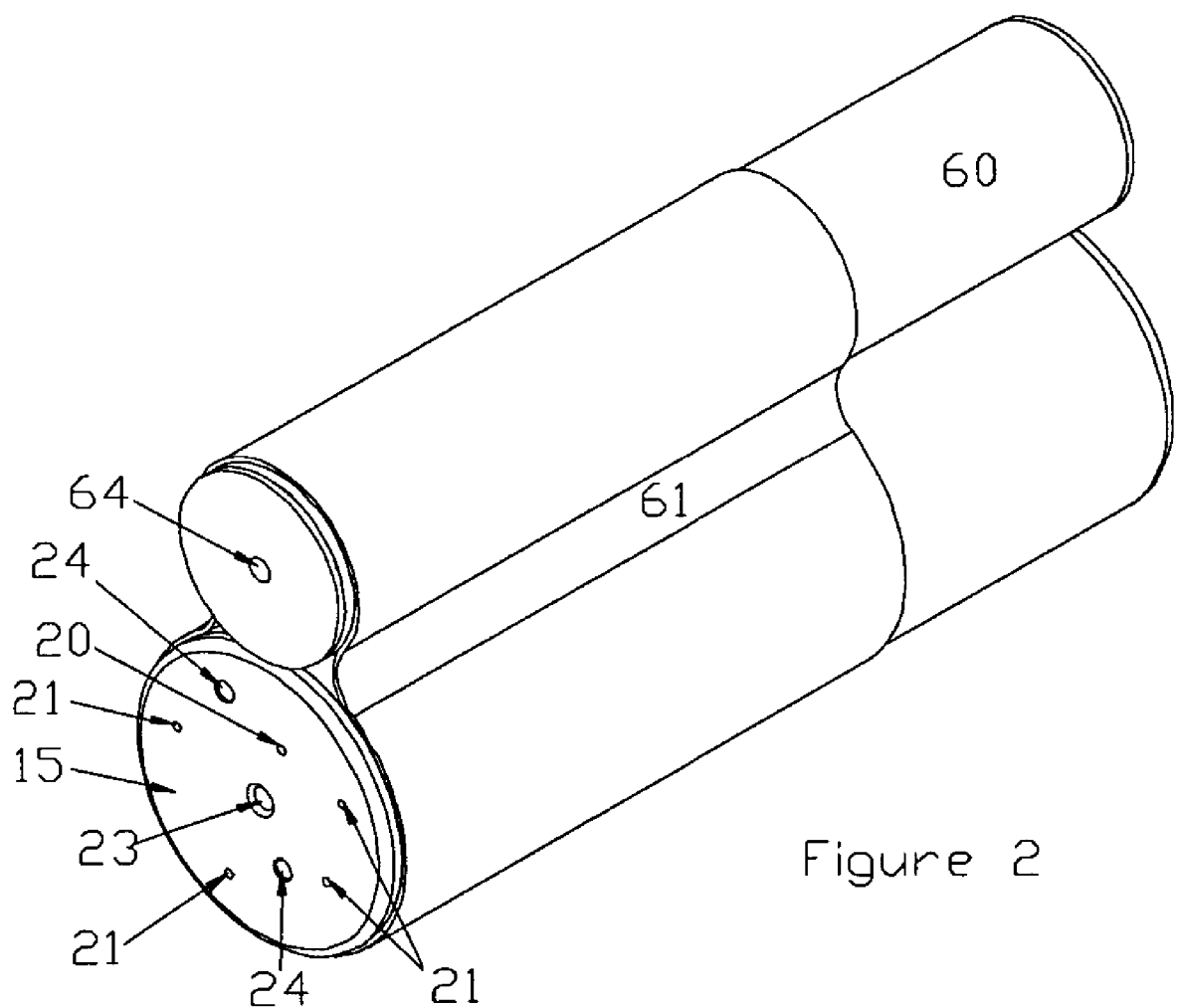
FIG. 2 is another view of the fuel cartridge similar to that seen in FIG. 1, but further including an acid reservoir.
Figure 8:
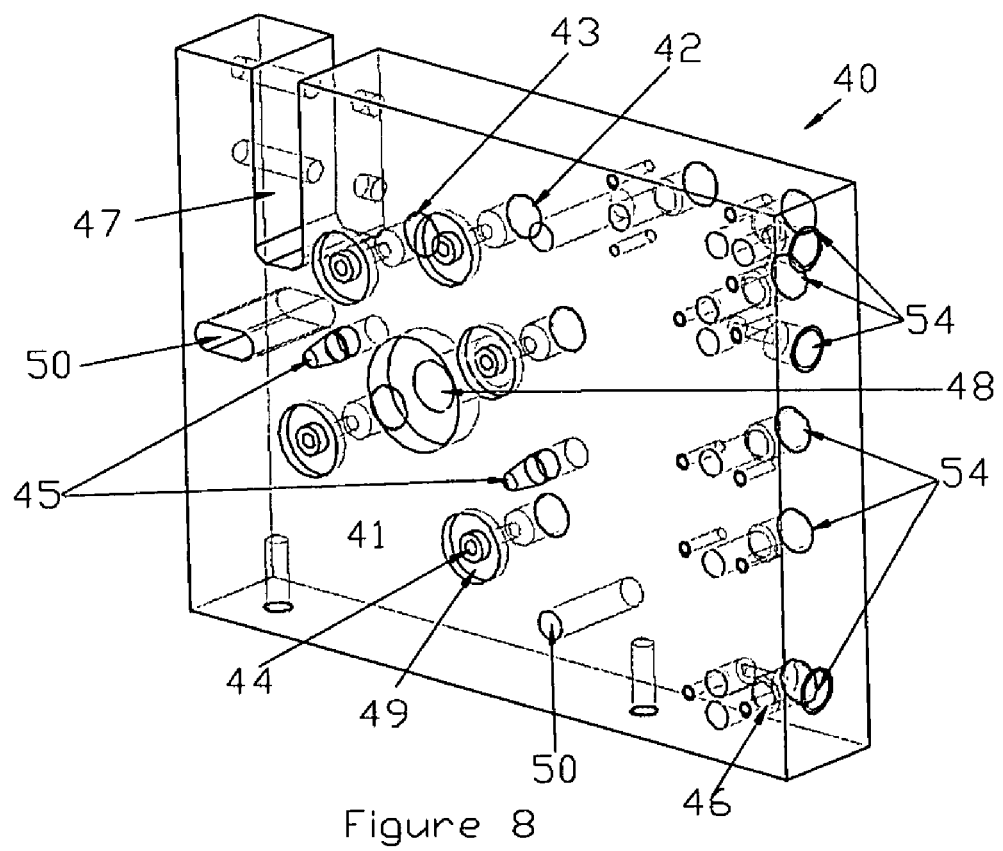
FIG. 8 illustrates one embodiment of the cartridge receiver plate.

The other end of housing 11 opposite rear end cap 12 will comprise a front end cap 15 which is more clearly seen in FIGS. 2 and 3. This embodiment of front end cap 15 will include a plurality of liquid reactant (e.g., water) inlet ports 21a-21d, a hydrogen gas outlet port 20, alignment structures 24 and a threaded center aperture 23. In certain embodiments described herein, the liquid reactant may be water or another aqueous reactant (e.g., a water based acid solution). For simplicity, liquid reactant inlet ports 21 may be referred to as water inlet ports 21 when describing certain embodiments. In the embodiment of FIGS. 1-3, alignment structures 24 are circular apertures which engage a cartridge receiver or in one embodiment, the receiver plate 40 as seen in FIG. 8 (discussed below). In this embodiment, alignment structures 24 are non-symmetrically positioned around center aperture 23 to ensure end cap 15 can only engage receiver plate 40 in one orientation. Of course, other embodiments could include different numbers of water inlet ports 21 and hydrogen outlet ports 20, along with different types of alignment structures. In the illustrated embodiment, front end cap 15 will include a groove 25, which will allow end cap 15 to engage and be locked into housing 11 by way of the front end of housing 11 being crimped into the groove 25 (or by any other method forming a substantially gas tight seal).

As best seen in FIG. 3B, the rear side of front end cap 15 will include a support assemblage 17 formed of structural elements having tube connectors 26 which secure liquid reactant injection tubes 30 (see FIG. 1A) to front end cap 15 and provide continuous passages between injection tubes 30 and ports 21. In one embodiment, injection tubes 30 are fixed to end cap 15 in a manner which substantially prevents tubes 30 from moving relative to end cap 15 along an axis parallel to the length of cartridge housing 11. Another support assemblage 17 will provide space for a check valve cavity 22a (the rear side of hydrogen outlet port 20) to hold an integrated check valve 22 allowing gas flow only in the outward direction, i.e., from the interior to the exterior of cartridge 10. In the preferred embodiment, the end cap is made of molded plastic, e.g., Delrin®, but one skilled in the art will see that end cap 15 could be made from a variety of materials, including aluminum, steel, stainless steel, copper, other plastics or composite materials. In the illustrated embodiment, the check valve may be a silicone duckbill type valve manufactured by Vernay Laboratories, Inc. of Yellow Springs, Ohio. As suggested in FIG. 1A, fluid injection tubes 30 will extend into the interior of cartridge housing 11 which holds a solid reactant (as explained in more detail below). In one embodiment, injection tubes 30 may extend into housing 11 at least half housing 11's length, although in other embodiments the injection tubes 30 may extend less than half the housing's length.

In one preferred embodiment, water injection tubes 30 will have an inside diameter ranging from about 0.5 to 5.0 mm with the inside diameter more preferably being about 1 mm. The injection tubes may be made of aluminum, brass, or other metal, PTFE, Nylon®, Delrin®, or other high temperature polymers. As suggested in FIG. 1A, a series of liquid distribution apertures 32 will be formed along the length of water injection tubes 30. In one embodiment, the liquid distribution apertures 32 will have a diameter which is no greater than about ⅕ the inside diameter of water injection tubes 30, and more preferably no greater than about ¹⁄₁₀ such inside diameter (e.g., on the order of about 50 to 1000 microns). Liquid distribution apertures 32 may be spaced in any manner to promote uniform liquid distribution, such as for example, every half inch on opposing sides of injection tubes 30. In certain embodiments, liquid distribution apertures may be spaced more closely along the length of tubes 30 as the tubes extend away from front end cap 15 in order to compensate for head loss in the fluid as it travels down the length of injection tube 30. Alternatively, the aperture size could be increased as the apertures become further from front end cap 15 in order to compensate for head loss.

A further embodiment seen in FIG. 1B would eliminate the multiple apertures 32 along the length of the tubes and have only one injection aperture 32 at the open end of the tubes (although this single aperture could be elsewhere along the length of the tubes). The length of the different tubes 30 could vary from the endcap 15 in order to distribute liquid reactant throughout the housing. The above described alternative embodiments along with other unspecified alternative embodiments may be employed to distribute liquid reactant at different locations within housing 11.

As suggested above, one embodiment of fuel cartridge 10 will contain a solid reactant such as an anhydrous chemical hydride. In certain embodiments, a chemical hydride may be considered a reducing compound containing a metal and hydrogen that generates hydrogen gas when it reacts with water or other oxidizing agents. Various examples of chemical hydrides are disclosed in U.S. application Ser. No. 10/459, 991 filed Jun. 11, 2003 which is incorporated by reference herein. Nonlimiting examples of chemical hydrides may include sodium borohydride, lithium borohydride, lithium aluminum hydride, lithium hydride, sodium hydride, and calcium hydride. In the embodiment seen in FIG. 5, the chemical hydride reactant will be enclosed within a fabric pouch 31. As used herein, "fabric" includes not only textile materials, but also includes paper based porous materials typically used for filtration purposes. One embodiment of the fabric will be a porous material which can maintain structural integrity at temperatures ranging from about $-20°$ C. to about $200°$ C., a pH ranging from about 4 to about 14, and which exhibits at least some wicking potential. Preferred fabrics may include woven Nylon, Rayon polyester blend (for example Pellon 30 manufactured by Pellon Consumer Products of Tucker, Ga.) or porous filter paper such as Paper 602 provided by National Filter Media Corporation, Salt Lake City, Utah. The wicking potential may be measured in distance water wicks divided by time. Illustrative examples include paper 603—6" in 60 min., Pellon 30—1.8" in 60 min., Nylon—1.2" in 60 min., coffee filter paper—2.3" in 60 min. In certain embodiments, a wicking potential of between 0.1 and 10 inches a minute may be employed; other embodiments could be between 0.5 and 3 inches a minute. In one embodiment, the thickness of the fabric or paper could be from about 3 mil to 12 mil, while the pore size of the fabric or paper could be between at least 1 micron and about 50 microns. Naturally, the present invention may include wicking potentials, fabric thicknesses, and pore sizes different from those listed above.

Figure 5:
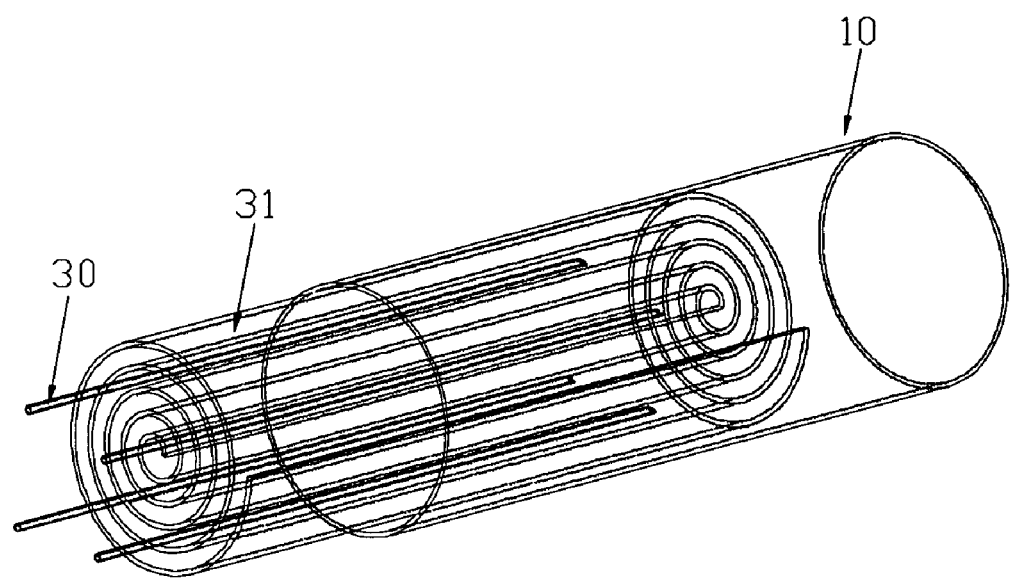
FIG. 5 illustrates a spirally wrapped chemical hydride pouch utilized in one embodiment of the present invention.
Figure 6:
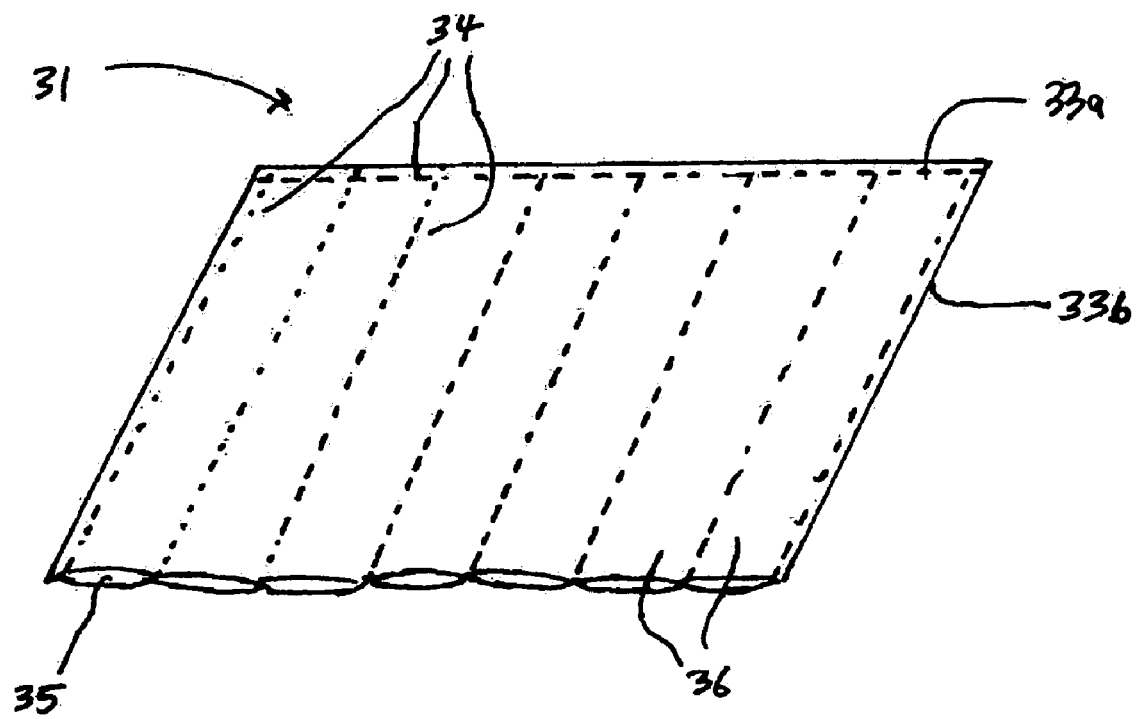
FIG. 6 illustrates one embodiment of the chemical hydride pouch.

In the embodiment of FIG. 5, the fabric pouch 31 is comparatively thin having a substantially greater area than thickness. Pouch 31 may be formed in any conventional manner. For example, viewing FIG. 6, it can be seen how two rectangular sheets of fabric material 33a and 33b may be sealed along three edges (for example by stitching 34) and segmented into 1 to 2 inch sections 36 (also by stitching) to leave open ends 35. The series of sections 36 thus formed are filled with a fine grain chemical hydride (described below) and sealed along the fourth edge by stitching closed open ends 35. An illustrative thickness of such a pouch 31 (i.e., the thickness of sections 36 when unrolled and charged with a chemical hydride) may be approximately ¼ of an inch in one embodiment and its unrolled dimensions could be approximately 5.75 inches by 20 inches. Then the pouch 31 is rolled to a diameter sufficiently small to be inserted into tubular housing 11 as suggested in FIG. 5 (the front end cap 15 has been removed for purposes of clarity). The water injection tubes 30 are then carefully inserted between overlapping layers of the rolled pouch 31. FIGS. 1 and 3A illustrate how in one embodiment, water ports 21 (and thus injection tubes 30) may be arranged in a nonuniform configuration such as a spiral pattern. For example, water port 21a in FIG. 3A is closest to the center point of end cap 15. Then water port 21b is radially spaced further from the center point, with water port 21c spaced even further and water port 21d spaced still further. In this manner, water injection tubes 30 may follow the spiral pattern of rolled pouch 31. However, other embodiments could utilize different orientations of pouch 31 or could use a series of smaller pouches 31 as opposed to the continuous pouch 31 seen in FIG. 6 and could use any arrangement of injection tubes 30. In one embodiment, the components within cartridge 10 will have a temperature stability between at least about $-20°$ C. to at least about $200°$ C. and a corrosion stability/resistance at pHs ranging from about 4 to about 14.

Figure 7:
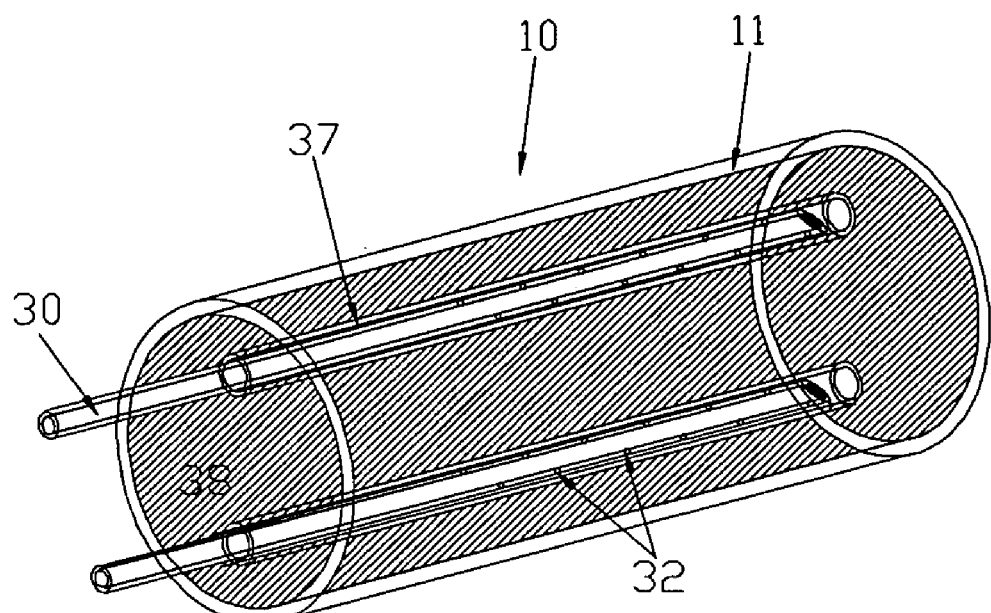
FIG. 7 illustrates the placement of the chemical hydride in another embodiment of the present invention.

An alternate embodiment of cartridge 10 is seen in FIG. 7. In this embodiment, the chemical hydride material 38 is not positioned within a pouch, but is placed directly within the interior space of cartridge housing 11 (seen with end cap 15 removed) and water injection tubes 30 will extend into the bed of chemical hydride material 38. However, in this embodiment water injection tubes 30 will be covered with a thin sleeve 37 of fabric such as a woven refractory material which in one embodiment is a 10 mil thick fabric sold under the tradename Siltex® manufactured by Mid Mountain Materials of Mercer Island, Wash. Naturally end cap 15 seen in FIGS. 1-3 would be modified to have two liquid injection ports 21 to match the two injection tubes 30 seen in FIG. 7. Although not explicitly shown in the drawings, when chemical hydride material 38 is placed directly in cartridge housing 11, it may also be advantageous to place a 0.125 inch thick layer of a porous carbon fiber felt material between the hydrogen outlet and hydride material in order to filter the exiting hydrogen gas.

Figure 14:
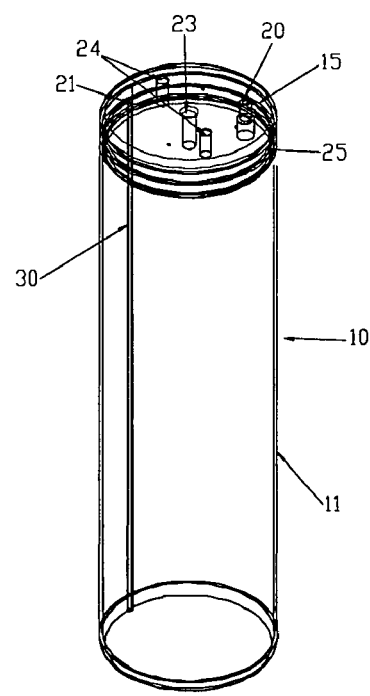
FIG. 14 is a perspective view of a further embodiment of the hydrogen fuel cartridge of the present invention.

A still further embodiment of cartridge 10 is seen in FIG. 14. In this embodiment the end cap 15 is similar to that described above. However, a single injection tube 30 extends into housing 11 toward the bottom of a bed of chemical hydride material. The injection tube 30 will have an aperture at the end of the tube. The cartridge 10 may be oriented vertically such that water injected into the hydride bed will react first with the hydride material at the bottom of the bed. As additional water is injected, the water will rise and activate hydride material along the length of cartridge 10. In other variations, the cartridge 10 may be in non-vertical orientations. The term "bed" of chemical hydride material may mean a mass of loose hydride material placed directly in the cartridge 10 (e.g., FIG. 7) or the hydride material being in a pouch (e.g., FIG. 5) which is inserted in cartridge 10 or any other manner of (or container for) positioning the hydride material in cartridge 10.

Figure 9:
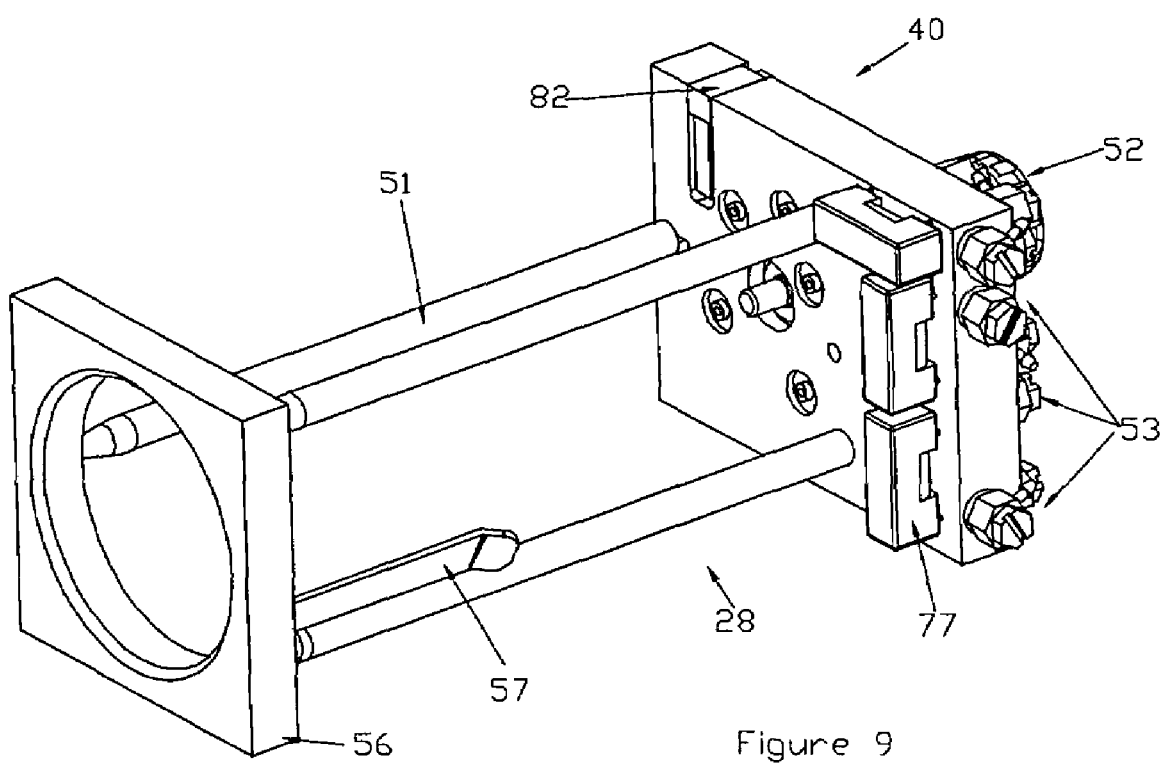
FIG. 9 illustrates one embodiment of the receiver assembly.

As suggested above, FIG. 8 illustrates one embodiment of receiver plate 40. Receiver plate 40 will include a receiver body 41 which has various structures formed thereon and within for mating with end cap 15 of cartridge 10. Within the receiver body 41 are alignment structures or guide pins 45 which will mate with alignment structures 24 on end cap 15. Additionally, receiver plate 40 includes a plurality of port connectors 44 which will mate with hydrogen and water ports 20 and 21 on end cap 15. Indentions 49 around port connectors 44 will accommodate sealing devices such as O-rings or gaskets. A port connector 44 will communicate with each hydrogen passage 42 and water passages 43 which is formed through receiver body 41. It will be understood that external water and hydrogen lines (see schematic in FIG. 10) will connect (directly or indirectly depending on the embodiment) to hydrogen passage 42 and water passages 43 and thereby provide fluid communication through receiver plate 40 to the hydrogen port 20 and water ports 21 of cartridge 10. FIG. 8 illustrates how one embodiment of receiver plate 40 will include internal water passages 46 and various inlets and outlets 54 for passages 46. FIG. 9 illustrates how the openings in water passages 46 will communicate with electronic control valves 77 and hose fittings 53. In the embodiment shown, hose fittings 53 are 90 degree, ⅛ inch I.D. hose barb fittings supplied by Clippard Instruments Laboratory, Inc. of Cincinnati, Ohio and control valves 77 are x-valves available from Parker Hannifan Corporation located in Cleveland, Ohio.

Figure 12:
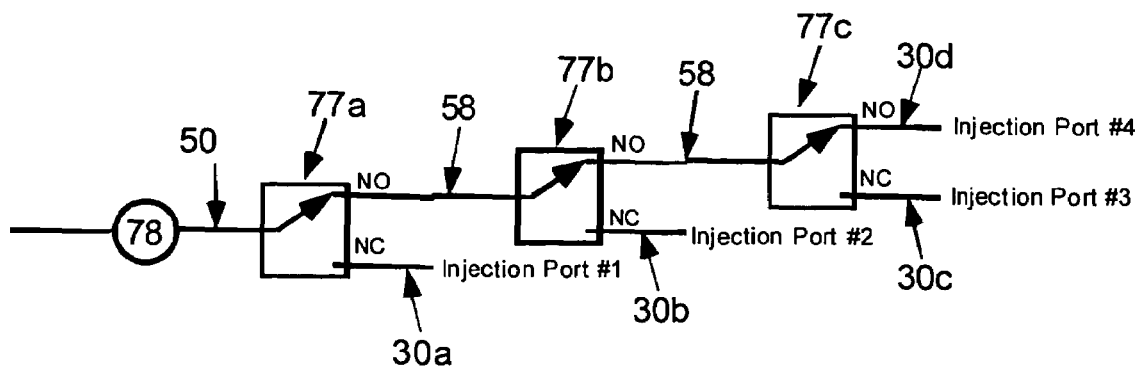
FIG. 12 is a schematic diagram illustrating the use of liquid control valves to direct liquid into the injection tubes.

In one embodiment, a plurality of hoses (not shown) will connect the plurality of water passages 46 (via hose fittings 53) in the receiver plate 40 to water passages 43, likewise equipped with hose fittings. In other embodiments, the passages 46 may connect directly to passages 43 through the internal volume of receiver plate 40, but forming long internal passages within receiver plate 40 adds substantial manufacturing complexity. The layout of fluid pathways and control valves in the receiver block of FIGS. 8 and 9 is described schematically in FIG. 12. A fluid pump 78 will direct fluid toward a series of three control valves 77a, 77b, and 77c through hose 50. Control valves 57 will have two orientations, an unactivated or normal open (NO) position and an activated or normal closed position (NC). It can be seen that control valves 77a, 77b, and 77c are connected in series by fluid pathway 58 (which would be the combination of hoses and passages if embodied in the receiver plate 40 of FIGS. 8 and 9). Control valves 77a and 77b will direct fluid to pathway 58 in the NO position and to their respective fluid injection tubes 30 when energized to the NC position by the associated control circuitry. Control valve 77c is connected somewhat differently since in the NO position, fluid is directed to injection tube 30d and in the NC position fluid is directed to injection tube 30c. The operation of control valves 77a to 77c in selectively directing fluid to different injection tubes will be readily apparent. To direct fluid to injection tube 30d, all valves 77a to 77c are left in the NO position; for injection tube 30c, valve 77c is moved to the NC position; for injection tube 30b, valve 77a will be in the NO position and valve 77b in the NC position; and for injection tube 30a, valve 77a will be in the NC position. In this manner, the path of fluid flow will pass through control valves 77 and allow these valves to control fluid delivered to injection tubes 30.

The receiver plate 40 seen in FIG. 8 will connect to end cap 15 (see FIG. 3A) by way of a holding assembly, one example of which is a bolt or other threaded member passing through aperture 48 in receiver plate 40 and engaging the threaded inner surface of center aperture 23 on end cap 15 in order to pull end cap 15 firmly against receiver plate 40 and form seals between hydrogen/water ports 20/21 and port connectors 44. FIG. 9 shows the complete receiver assembly 28 including support plate 56 and connecting rods 51 engaging rod apertures 50 in receiver plate 40. In the embodiment shown, one rod aperture 50 will be elongated and the others round to assist in orienting the rods 51 for insertion into receiver plate 40. The cartridge 10 slides through the opening in support plate 56 and in between the connecting rods 51 and seals against the receiver plate 40 as described previously with the threaded end of knob 52 extending through aperture 48. A mounting arm 57 will extend from support plate 56 and rest against cartridge 10. A cartridge temperature sensor described herein will be attached to mounting arm 57. In the embodiment of FIG. 9, the electronic valves 77 are shown connected to the receiver plate 40. Slot 47 in the receiver plate 40 shown in FIG. 8 firmly holds the cartridge sense switch 82 as shown in FIG. 9. In one embodiment, cartridge sense switch 82 is ZM series microswitch with lever manufactured by Honeywell International, Inc. of Morristown, N.J. and will detect when cartridge 10 is in direct or near contact with sense switch 82.

In one embodiment of the present invention, the chemical hydride reactant utilized in the fuel cartridge may be a dry, powdered form of sodium borohydride ($NaBH_4$) mixed with an activating agent. The $NaBH_4$ is particularly suitable for use in the pouch 31 seen in FIG. 5 and in one embodiment; the $NaBH_4$ will have a grain size ranging from about mesh 10 to about mesh 1000. It is preferred that the activating agent be a powdered solid when mixed with $NaBH_4$, since solids tend to react very slowly with each other. However, in alternative embodiments, the activating agent could also be mixed into an organic/oil solvent. In addition, the activating agent in certain embodiments is preferably water soluble to increase its effectiveness, since the greater its solubility, the greater its potential to activate the water/$NaBH_4$ reaction.

One effective activating material is magnesium chloride ($MgCl_2$), since it is relatively lightweight, low cost, and strongly activating. Other potential activating agents are other salts of Group IIA (alkaline earth metals) or Group VIIB (halides), such as $BeF_2$, $BeCl_2$, $BeBr_2$, $BeI_2$, $MgF_2$, $MgBr_2$, $Mg_2I$, $CaF_2$, $CaCl_2$, $CaBr_2$, and $CaI_2$. The fluorides and chlorides are preferred because they have a lower molecular weight. However, some of these salts may be less preferred depending on their degree of solubility in water or if they are considered toxic (e.g., beryllium compounds).

Activating agents may also include other water soluble salts such as Group IA (alkali metals) salts including LiF, LiCl, LiBr, LiI, NaF, NaCl, NaBr, NaI, KF, KCl, KBr, and KI. Group IA and Group IIA hydroxides may be less preferred, since they make basic solutions in water and thus reduce the reaction rate. Group IA and Group IIA oxides may also be less preferred since they tend to be more stable and thus not as reactive. However, Group IA and Group IIA sulfides and selenides, such as $Li_2S$, $Li_2Se$, may be better activating agents if they are sufficiently water soluble. In one preferred embodiment, the activating agents will be from the group of $MgCl_2$, $BeCl_2$, $CuCl_2$, LiCl, NaCl, or KCl. However, any of the above activating agents (or others not listed) could possibly be employed given the proper design and use conditions. In certain embodiments, the activating agent will have a grain size ranging from about mesh 10 to about mesh 1000.

In one preferred embodiment, the quantity of activating agent mixed with the chemical hydride will be from about 25 to about 65 weight percent and more preferably about 50 to about 60 weight percent. In one embodiment, the quantity of activating agent is 55 weight percent. In the embodiment where the solid reactant is 55 weight percent $MgCl_2$, approximately 0.8 gm of water will be required to fully react each gm of solid reactant. One consideration in optimizing the amount of activating agent is determining the minimum amount of the material which gives the desired hydrogen generation rate and results in complete reaction/utilization of the $NaBH_4$. For a 55 weight % $MgCl_2$/$NaBH_4$ mixture, the energy density is 3116 Whr/kg. For comparison, the energy density of a 20 weight % $NaBH_4$/$H_2O$ mixture (i.e., $NaBH_4$ dissolved in water) is 1066 Whr/kg, while the energy density for pure $NaBH_4$ is 7101 Whr/kg.

An alternative activating agent may be an anhydrous or powdered acids such as boric acid ($H_3BO_3$), oxalic acid, tartaric acid, etc. Such anhydrous acids can be mixed with the $NaBH_4$ without reaction, but when water is added, the anhydrous acid dissolves and thus causes a reaction. Weak or relatively insoluble anhydrous acids such as boric acid when mixed with $NaBH_4$ produce hydrogen in the presence of water at a relatively low rate, and thus are less preferred. Strong acids such as oxalic acid are very soluble in water and generate substantial hydrogen when mixed with $NaBH_4$. However, this mixture is difficult to controllable and is also less preferred. However, intermediate strength acids, such as tartaric acid or benzoic acid are more favorable. In one preferred embodiment, the strength (Ka) of the dry acid will range from about $1\times10^{-4}$ to about $1\times10^{-11}$. In certain embodiments, the powdered acid will have a grain size ranging from about mesh 10 to about mesh 1000. In one preferred embodiment, the quantity of tartaric acid mixed with $NaBH_4$ will be from about 5 to about 50 weight percent and more preferably about 8 to about 12 weight percent. In this embodiment, approximately 0.8 gm of water will be required to fully react each gm of solid reactant.

As a further alternative, an inexpensive, water-insoluble catalyst may be mixed with the $NaBH_4$. The catalyst can act to accelerate the water/$NaBH_4$ reaction as water is injected. Such metal catalyst could include Co, Ni, Cu, Pt, Pd, Fe, Ru, Mn, and Cr. Typically, the metal catalyst will be in a powder form (e.g., particles less than 25 um) and will be added to the chemical hydride in an amount of about 25 weight percent to about 65 weight percent. In this embodiment, approximately 0.8 gm of water will be required to fully react each gram of solid reactant.

A still further alternative to mixing an anhydrous activating agent with the $NaBH_4$ may be to mix the water soluble activating agent in with the water before it is injected into the cartridge containing a bed of anhydrous $NaBH_4$ or other metal hydride. This has the advantage that an aqueous substance such as hydrochloric acid (HCl) may be used. In this embodiment, the activating material is held in separate container or reservoir 60 such as seen in FIG. 2. This container may be attached to the cartridge housing 11 but could be detached in other embodiments. FIG. 2 illustrates reservoir 60 connected to housing 11 by way of strap 61. In one embodiment, strap 61 will be formed of aluminum, stainless steel, or composite polymer material in order to hold reservoir 60 in rigid orientation with housing 11. The liquid contents of reservoir 60 will be withdrawn through reservoir port 64 and be directed into liquid injection tubes 30 via liquid passages 43 in receiver plate 40. Although not actually shown in the drawings, it can be envisioned how one embodiment of receiver plate 40 may be modified such that it will have a port mating with reservoir port 64 and the contents of reservoir 60 will be directed to receiver plate 40 in the same manner as water described above. In one embodiment seen in FIGS. 4A and 4B, reservoir 60 includes a plunger 62 positioned therein. Plunger 62 will move toward port 64 as fluid is removed from reservoir 60. Vent hole 63 prevents a vacuum from forming behind plunger 62 and resisting its movement toward port 64. The plunger is moved forward by pump 78 (see FIG. 13) applying suction to port 64.

Returning to the example acid listed above, concentrated HCl acid (38 weight %) could be mixed into the water to give a concentration of 28 weight %. When this solution is controllably injected into the $NaBH_4$, it reacts readily to generate hydrogen. At this acid concentration (28 weight %), approximately 0.4 gm of acid solution will be required to fully react each gm of $NaBH_4$. It is possible to control the reaction rate by controlling the concentration of acid in the water in addition to the acid solution injection rate. It is also possible to mix water soluble salts, such as $MgCl_2$ into the water and then inject the mixture into the bed of $NaBH_4$. Nor is the acid containing liquid necessarily limited to aqueous solutions. In one preferred embodiment, the aqueous solution injected into the bed of $NaBH_4$ will have a pH ranging from about 1 to about 6 and more preferably a pH of about 2. In addition to HCl, other suitable acids could include (but are not limited to) nitric acid, sulfuric acid, acetic acid, hydrofluoric acid, hydrobromic acid, carbonic acid, etc., or mixtures thereof.

Although $NaBH_4$ is mainly discussed above, alternative chemical hydrides may include (but are not limited to) lithium borohydride, lithium aluminum hydride, lithium hydride, sodium hydride, and calcium hydride. In certain embodiments, these latter chemical hydrides need not be combined with a powdered activating agent as described above and may be activated with water alone. In one preferred embodiment, these latter chemical hydrides will be utilized in a cartridge such as seen in FIG. 7.

Fuel cartridges such as those described above will typically be employed in a hydrogen generation system. One embodiment of such a hydrogen generation system is shown schematically in FIG. 10. This hydrogen generation system 1 will generally comprise a fuel cartridge 10 connected to receiver plate 40 with a liquid reactant (e.g., water) line 79 supplying water to fuel cartridge 10. A water pump 78 controlled by control system 75 will provide a carefully metered amount of water to fuel cartridge 10. In one preferred embodiment, control system 75 consists of a micro-processor and related control circuitry such as a PIC microcontroller 16F877A. Control system 75 will also operate cooling fans 81, switching valves 77, and transfer valve 84. Moreover, control system 75 will receive data on system parameters from temperature sensor 80, cartridge sensor 82, and hydrogen pressure sensor 89. In one embodiment, temperature sensor 80 is mounted against the external skin of aluminum housing 11. To prevent hydrogen from escaping from the system when the cartridge is removed, a check valve 87 is incorporated into the hydrogen line between the receiver plate and the hydrogen trap 83.

Hydrogen gas exiting cartridge 10 will flow through a check valve 87 and a hydrogen filter/water trap 83 before being directed to a fuel cell or other device to which hydrogen is to be supplied. Filter/water trap 83 serves the dual purpose of filtering particulate out of the hydrogen and also removing excess moisture from the hydrogen gas. A water condenser/reservoir 85 will collect water from any moist air returned from the fuel cell or other hydrogen consuming device and will also store water collected from water trap 83 and transferred via transfer valve 84.

In operation, control system 75 will determine the volume of water to pump into fuel cartridge 10 based upon monitoring parameters such as the temperature of the chemical hydride (as indicated by temperature sensor 80) and the hydrogen pressure within the system as measured by pressure sensor 89. As hydrogen pressure drops below a predetermined level in system 1, water pump 78 will be activated to deliver water to fuel cartridge 10, thereby causing the chemical hydride in cartridge 10 to release addition hydrogen gas. In one preferred embodiment, switching valves 77 will be individually controlled by control system 75 as described above. This allows pump 78 to deliver water through only one water injection tube 30 at a time and to sequentially deliver water to each injection tube 30. This sequential method of delivering water may in some instances provide a more uniform distribution of water than if all water injection tubes were simply manifolded together without individual control of water flow to each injection tube 30. Likewise, the temperature sensor 80 monitoring the temperature of the chemical hydride will allow control system 75 to make decisions regarding whether fans 81 should be turned on to cool cartridge 10 or whether water should be limited to slow down the reaction rate of the chemical hydride. Hydrogen generation system 1 may also include the cartridge sensor 82 which will signal control system 75 as to whether a fuel cartridge 10 is presently installed in the system and will also provide control system 75 with information concerning when a spent cartridge has been removed and a new, fully charged cartridge installed.

As hydrogen gas flows through filter/water trap 83, excess moisture in the hydrogen gas will be removed and when a sufficient amount of water has accumulated, will be transferred via transfer valve 84 to water condenser/reservoir 85. Hydrogen gas exiting filter/water trap 83 will be directed through line 90 to the particular hydrogen consuming device, which for illustrative purposes will be considered a fuel cell in the present description. Typically, a regulator 88 will be positioned in line 90 to assure the fuel cell is supplied with hydrogen at a constant pressure. If the hydrogen consuming device produces water vapor as a by-product (as do fuel cells), the moist air will be directed via line 86 back to condenser 85 and the water recovered from the air. Likewise, water vapor in the hydrogen passing through purge line 91 (another characteristic feature of fuel cells) will be recovered in condenser 85.

Figure 10:
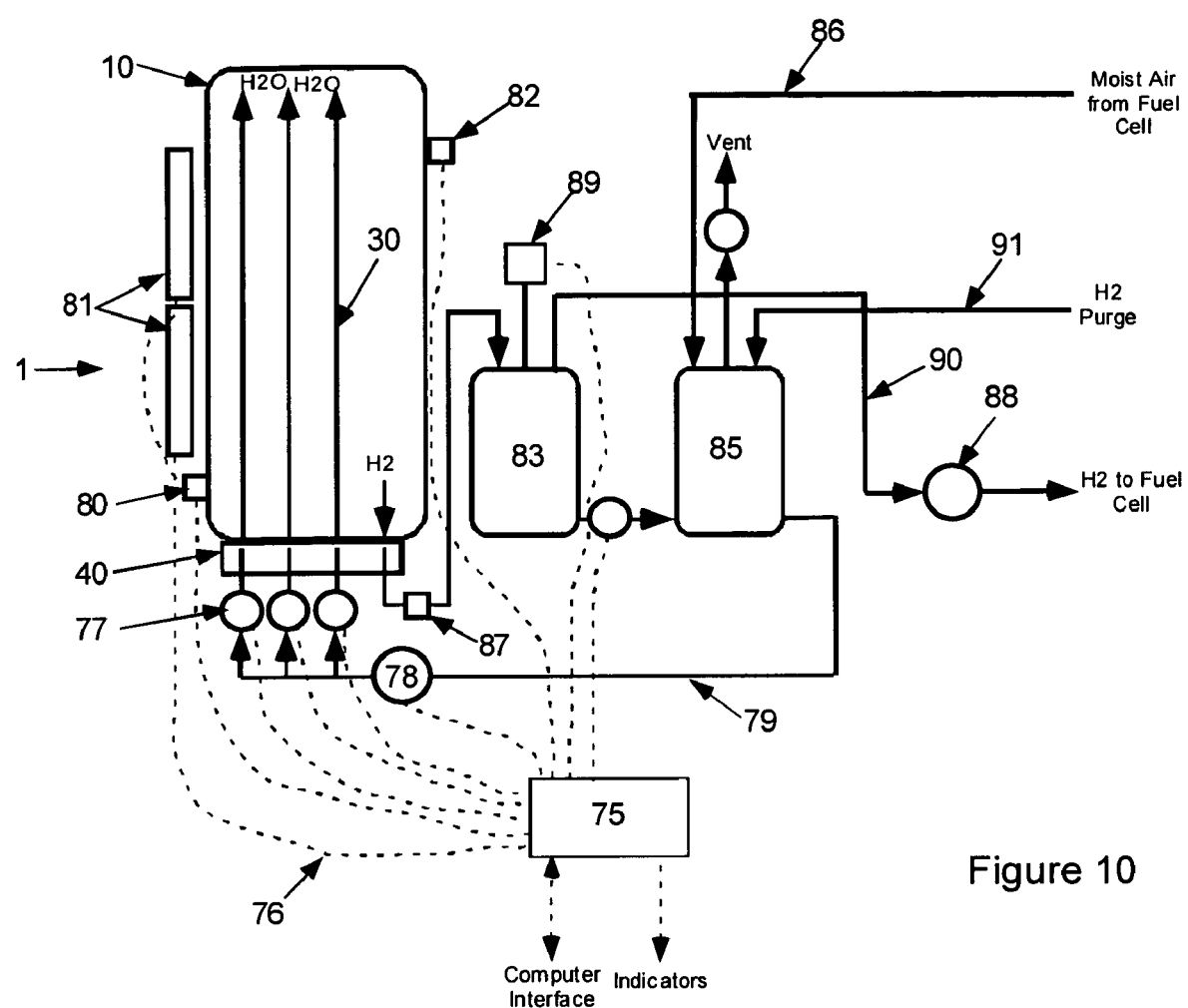
FIG. 10 is a schematic diagram of one embodiment of the hydrogen generation system of the present invention.
Figure 11:
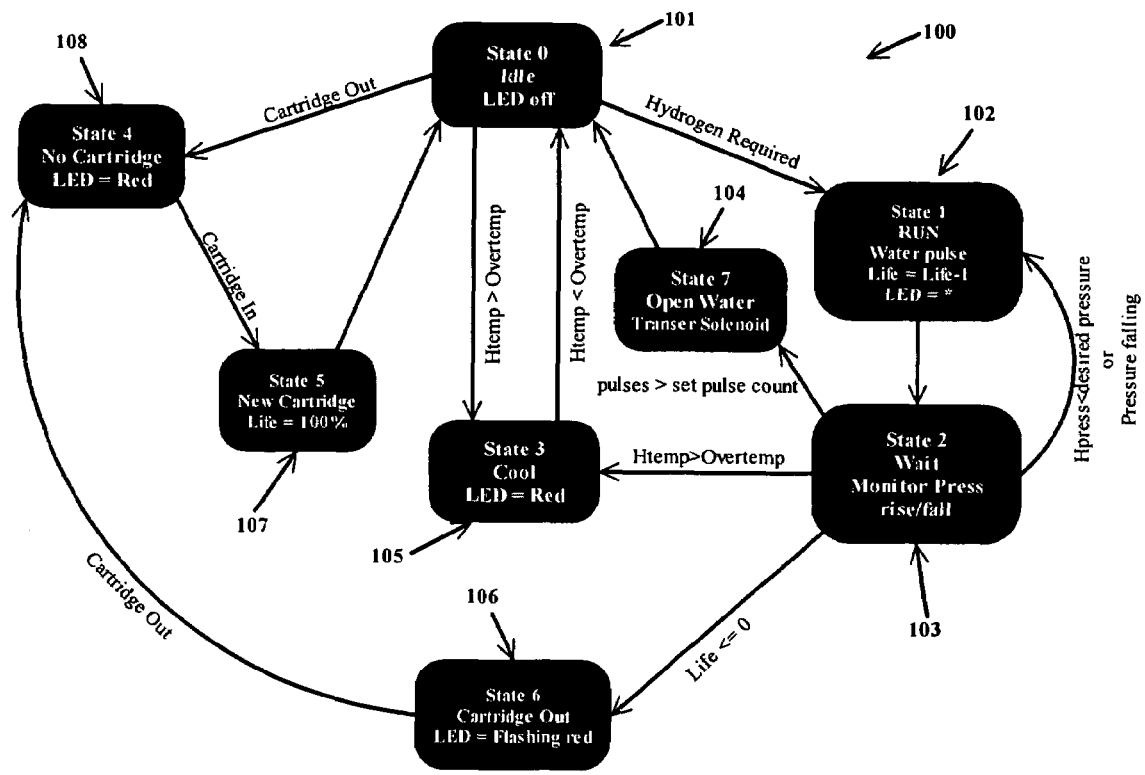
FIG. 11 is a state diagram illustrating the operation of one embodiment of the hydrogen generation system of the present invention.
Figure 13:
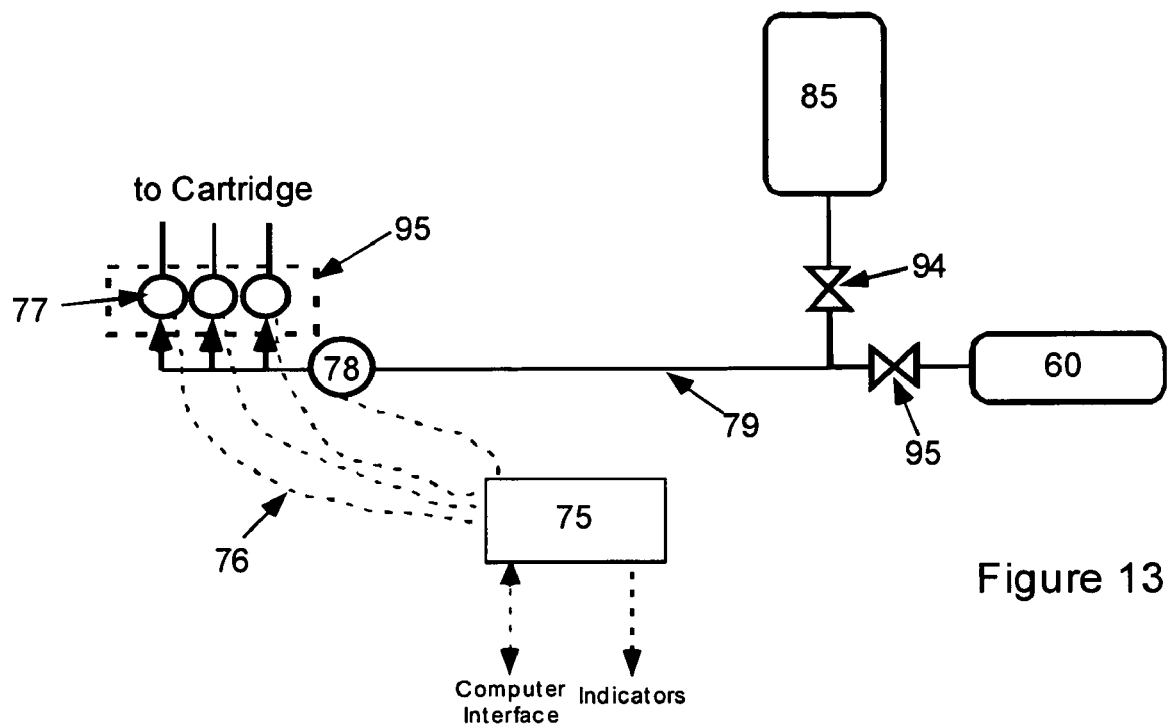
FIG. 13 is a partial schematic diagram illustrating modifications made to FIG. 10 when an acid reservoir is employed.

When an embodiment having acid reservoir 60 is employed, a portion of the schematic seen in FIG. 10 may be modified as suggested in FIG. 13. In this embodiment, a metering valve 95 will be positioned between pump 78 and acid reservoir 60 while a metering valve 94 is positioned between pump 78 and water reservoir 85. In one embodiment, metering valves 94 and 95 may be stainless steel adjustable needle-type valves such as provided by Swagelock Company of Solon, Ohio. Using these types of valves, the amount of acid and water drawn upon each activation of pump 78 is preset.

In another embodiment of the present invention, the injection switching valves 77 seen in FIG. 10 can be replaced with a manifold 95 (illustrated in the alternative with dashed lines in FIG. 13). In this case, fluid from the injection pump 78 is split equally between the multiple injection tubes 30 which are connected in parallel. Parallel injection tubes are preferably very uniform with tight tolerances so that the pressure drop along the length of each injection tube is the same.

FIG. 10 is a state diagram 100 illustrating the controller logic which could be utilized in one embodiment of the present invention. Beginning at an idle state (block 101), control system 75 monitors the cartridge temperature, the cartridge in/out status, the hydrogen demand status (e.g., does the fuel cell currently require hydrogen), and the pump/valves status. Presuming the use of a bi-color LED indicator (e.g., red/green), the idle state could be indicated by all LED illumination being off. When control system 75 is signaled that hydrogen is required, the system will enter state 1 (block 102). Control system 75 will signal pump 78 to inject a predetermined amount or "pulse" of water (e.g., one cycle of pump 78) toward switching valves 78. Control system 75 will determine which injection tube 30 received the last water pulse and then open or shut the appropriate valves 77 to ensure the current water pulse is directed to the desired injection tube 30. As alluded to above, the water pulses will typically be directed in sequence to the various injection tubes 30 to evenly distribute water throughout the hydride bed. Additionally, control system 75 will monitor the total number of pulses (i.e., total volume of water) injected into cartridge 10. Since the cartridge has a known amount of chemical hydride, the volume of water needed to completely react with that weight of chemical hydride may be calculated. By tracking the volume of water injected into cartridge 10, control system 75 may accurately estimate when all the chemical hydride in cartridge 10 has been reacted with water and thus when cartridge 10 should be considered exhausted or spent. An LED response (e.g., flashing red/green) may then indicate when the amount of unreacted chemical hydride in cartridge 10 is becoming low and the current cartridge 10 should be replaced.

State 2 (block 103) will monitor the increased pressure of hydrogen due to the injection of a water pulse. If the current hydrogen pressure is less than the desired hydrogen pressure (or the hydrogen pressure appears to be falling), the control system will return to state 1 and signal that pump 78 is to injection another pulse of water. If the cartridge temperature exceeds a predetermined value, the system will activate fans 81. If the temperature continues to increase above a higher predetermined value, then the system will enter state 3 (indicated by a red LED) which will cease injection of further water until the cartridge temperature returns to the specified operating range. State 7 (block 104) will monitor when water should be transferred from filter/trap 83 to reservoir 85 and accordingly activate transfer valve 84.

When the total volume of water injected into cartridge 10 is sufficient to react approximately the total weight of chemical hydride in cartridge 10, state 6 (block 106) will be entered indicating with a flashing red LED that cartridge 10 is exhausted and needs to be replaced. While the spent cartridge is removed, state 4 (block 108) will indicate with a red LED that no cartridge is present in the system. Once a new cartridge 10 is inserted into the system, state 5 (block 107) resets the cartridge life counter such that state 1 may once again begin counting pulses of water injected into the new cartridge 10 in order to monitor the remaining life of the new cartridge once the system resumes generation of hydrogen. Naturally, the state diagram of FIG. 10 is simply one version of control system 75's operation and many alternate sequences of operation may be employed in other embodiments of the invention.

Although the present invention has been described in terms of selected specific embodiments, those skilled in the art will recognize many modifications and variations of the invention. Additional non-limiting exemplary embodiments may include:

A. A hydrogen generation system comprising:
  a. at least one cartridge comprising at least one liquid inlet port and at least one gas outlet port and containing a substantially anhydrous hydride reactant;
  b. at least one liquid conduit extending into said cartridge, said liquid conduit having at least one liquid distribution aperture formed thereon;
  c. a cartridge receiver removably engaging said cartridge, said cartridge receiver comprising passages corresponding to said gas outlet port and said liquid inlet port on said cartridge; and
  d. a liquid reactant injection control system operatively connected to said cartridge receiver, said control system reading at least one reaction parameter and adjusting an amount of liquid reactant injected from said distribution aperture based upon said at least one reactant parameter.

B. The hydrogen generation system according to embodiment A, wherein said hydride reactant forms a bed and said liquid conduit extends along at least half of a length of said bed.

C. The hydrogen generation system according to embodiment A, wherein said liquid reactant is an aqueous reactant.
D. The hydrogen generation system according to embodiment A, wherein a cooling system comprises at least one fan generating an air flow across said cartridge.
E. The hydrogen generation system according to embodiment A, wherein a fabric pouch is rolled within said cartridge and said liquid reactant conduit extends between folds of said fabric pouch.
F. The hydrogen generation system according to embodiment A, wherein a fabric pouch comprises at least one chosen from woven, Pellon 30, Nylon sheet or porous paper.
G. The hydrogen generation system according to embodiment F, wherein said fabric maintains a structural integrity at temperatures ranging from about −20° C. to about 200° C., a pH ranging from about 4 to about 14, and which exhibits at least some wicking potential.
H. The hydrogen generation system according to embodiment A, further comprising an aqueous reactant having a pH of between about 1 and about 6.
I. The hydrogen generation system according to embodiment A, wherein said liquid reactant is an aqueous acid solution.
J. The hydrogen generation system according to embodiment A, wherein said cartridge receiver is a receiver plate having hydrogen and liquid inlet ports mating with said ports of said cartridge.
K. The hydrogen generation system according to embodiment J, wherein a receiver assembly comprises a support plate attached to said receiver plate by at least two support rods.
L. The hydrogen generation system according to embodiment J, wherein said receiver plate includes at least one passage having a control valve connected thereto and said passage communicates with said liquid inlet port.
M. A fuel cartridge for a hydrogen generating system, said cartridge comprising:
a. a cartridge comprising an end cap and containing a bed of substantially anhydrous hydride reactant;
b. at least one liquid conduit fixed to said end cap and extending into said bed, said liquid conduit having at least one liquid distribution aperture formed thereon, said liquid distribution aperture having a diameter of between about 50 microns and about 1000 microns such that liquid reactant may pass in liquid form into said bed of hydride reactant;
c. wherein said end cap comprises a liquid inlet port communicating with said liquid conduit and a gas outlet port, both said liquid inlet port and said gas outlet port being adapted to seal with a cartridge receiver.
N. The fuel cartridge according to embodiment M, wherein said activating agent is an anhydrous acid having an acid constant Ka of between approximately $10^{-4}$ to approximately $10^{-11}$.
O. The fuel cartridge according to embodiment N, wherein said activating agent is at least one of tartaric acid or benzoic acid.
P. The fuel cartridge according to embodiment M, wherein multiple liquid conduits extend into said cartridge.
Q. The fuel cartridge according to embodiment M, wherein said hydride is enclosed in a fabric pouch having a substantially greater area than thickness.
R. The fuel cartridge according to embodiment Q, wherein said fabric pouch is rolled within said cartridge and said water conduit extends between folds of said fabric pouch.
S. The fuel cartridge according to embodiment Q, wherein said fabric pouch comprises a woven Nylon material.
T. The fuel cartridge according to embodiment M, wherein said nonuniform configuration is a spiral pattern.
U. The fuel cartridge according to embodiment M, wherein a liquid acid containing reservoir is attached to said cartridge.
V. The fuel cartridge according to embodiment M, further comprising at least one port allowing for the release of gas from said cartridge.
W. The fuel cartridge according to embodiment M, further comprising a plurality of liquid conduits wherein at least two of said conduits are of different lengths.
X. The fuel cartridge of embodiment M wherein said liquid conduit further comprises a plurality of liquid distribution apertures.
Y. The fuel cartridge of embodiment M, further comprising a plurality of liquid conduits wherein said liquid distribution aperture one liquid conduit is at a different location than said liquid distribution aperture on at least one other conduit.
Z. The fuel cartridge of embodiment Y, wherein said distribution aperture is formed by an open end of said conduit.

All such embodiments and other modifications and variations should be considered within the scope of the following claims.

We claim:

1. A fuel cartridge for a hydrogen generating system, said cartridge comprising:
a housing comprising an end cap and containing a substantially anhydrous hydride reactant and an activating agent comprising a salt having a metal selected from the group consisting of alkaline earth metals and alkali metals;
at least one liquid conduit fixed to the end cap and extending into the anhydrous hydride reactant, the liquid conduit at least one liquid distribution aperture formed thereon, such that liquid reactant may pass in liquid form into the hydride reactant;
wherein the end cap comprises a liquid inlet port communicating with the liquid conduit and a gas outlet port, both the liquid inlet port and the gas outlet port being adapted to seal with a housing receiver.

2. The fuel cartridge according to claim 1, wherein the hydride reactant comprises about 20 percent by weight to about 65 percent by a weight of activating agent.

3. The fuel cartridge according to claim 1, wherein the activating agent is water soluble.

4. The fuel cartridge according to claim 1, wherein the activating agent comprises at least one material selected from the group consisting of $BeF_2$, $BeCl_2$, $BcBr_2$, $BeI_2$, $MgF_2$, $MgBr_2$, $MgCl_2$, $MgI_2$, $CaF_2$, $CaCl_2$, $CaBr_2$, $CaI_2$, $LiF$, $LiCl$, $LiBr$, $LiI$, $NaF$, $NaCl$, $NaBr$, $NaI$, $KF$, $KCl$, $KBr$, $KI$, $Li_2S$, and $Li_2Se$.

5. The fuel cartridge according to claim 1, wherein the hydride is enclosed in a fabric pouch having a substantially greater area than thickness, the fabric pouch configured to be inserted into the housing.

6. The fuel cartridge according to claim 1, further comprising a plurality of liquid conduits, wherein the plurality of liquid conduits are spaced radially from a center point of the end cap in a nonuniform configuration.

7. The fuel cartridge according to claim 1, wherein the anhydrous hydride reactant comprises an anhydrous hydride and the liquid reactant comprises a mixture of water and anhydrous activating agent.

8. The fuel cartridge of claim 1, wherein the anhydrous hydride reactant is selected from a group consisting of sodium borohydride, lithium borohydride, lithium aluminum hydride, lithium hydride, sodium hydride, and calcium hydride.

9. An apparatus for hydrogen generation, the apparatus comprising:
a housing configured to contain a mixture of anhydrous hydride reactant and an activating agent comprising a salt having a metal selected from the group consisting of alkaline earth metal and alkali metals;
at least one liquid conduit extending into the container configured to pass a liquid into the mixture; and
wherein the housing further comprises a liquid inlet port and a gas outlet port.

10. The apparatus of claim 9, wherein the hydride reactant comprises sodium borohydride.

11. The apparatus of claim 9, wherein the mixture comprises in the range of between about 20 percent by weight to about 65 percent by weight of the activating agent.

12. The apparatus of claim 9, wherein the activating agent comprises at least one material selected from the group consisting of $BeF_2$, $BeCl_2$, $BeBr_2$, $BeI_2$, $MgF_2$, $MgBr_2$, $MgCl_2$, $MgI_2$, $CaF_2$, $CaCl_2$, $CaBr_2$, $CaI_2$, LiF, LiCl, LiBr, LiI, NaF, NaCl, NaBr, NaI, KF, KCl, KBr, KI, $Li_2S$, and $Li_2Se$.

13. The apparatus of claim 9, further comprising a plurality of liquid conduits, wherein the plurality of liquid conduits are spaced radially from a center point of an end of the housing in a nonuniform configuration.

14. The apparatus of claim 9, further comprising a fabric pouch having a substantially greater area than thickness configured to contain a portion of the mixture and promote a complete reaction of the mixture, the fabric pouch disposed with in the housing.

15. The apparatus of claim 1, wherein the liquid reactant has a lower freezing point temperature than water.

16. The apparatus of claim 15, wherein the liquid reactant comprises a freezing point lowering additive.

17. The apparatus of claim 16, wherein the freezing point lowering additive comprises an alcohol.

* * * * *

UNITED STATES PATENT AND TRADEMARK OFFICE
CERTIFICATE OF CORRECTION

PATENT NO. : 7,438,732 B2
APPLICATION NO. : 11/270947
DATED : October 21, 2008
INVENTOR(S) : James Kevin Shurtleff et al.

It is certified that error appears in the above-identified patent and that said Letters Patent is hereby corrected as shown below:

Column 4, Line 10
Reads "21 a"---should read "21a"

Column 7, Line 1
Read "an anhydrous"---should read "anhydrous"

Column 7, Line 11
Reads "to controllable"---should read "to control"

Column 10, Line 17
Reads "injection"---should read "inject"

Column 14, Line 11
Reads "with in"---should read "within"

Signed and Sealed this

Seventeenth Day of February, 2009

JOHN DOLL
*Acting Director of the United States Patent and Trademark Office*